A. E. HICKLING & H. LAMB.
LOCK NUT.
APPLICATION FILED FEB. 27, 1914.
1,210,310. Patented Dec. 26, 1916.
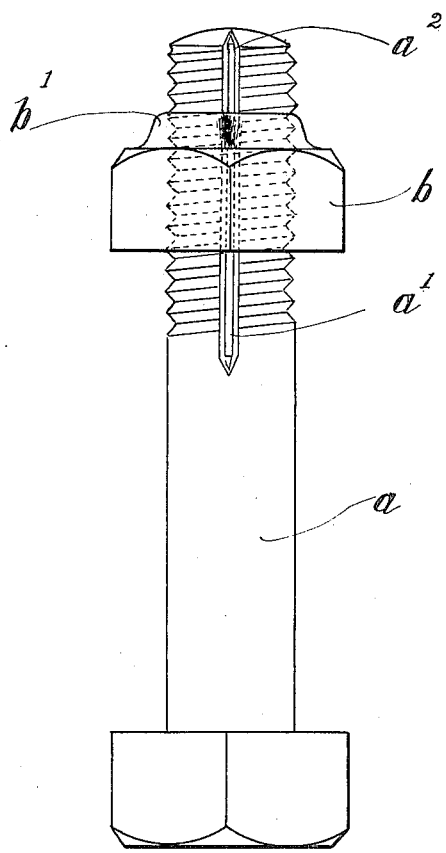
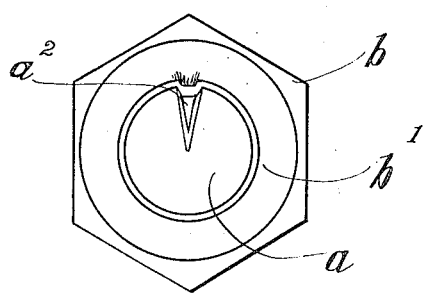
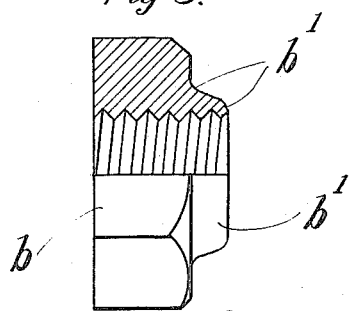

UNITED STATES PATENT OFFICE.

ALBERT EDGAR HICKLING AND HARRY LAMB, OF ECCLES, NEAR MANCHESTER, ENGLAND.

LOCK-NUT.

1,210,310.  Specification of Letters Patent.  Patented Dec. 26, 1916.

Application filed February 27, 1914. Serial No. 821,479.

*To all whom it may concern:*

Be it known that we, ALBERT EDGAR HICKLING and HARRY LAMB, of 218 Barton Lane, Eccles, near Manchester, England, having hereby invented certain new and useful Improvements in Lock-Nuts, (for which we have obtained a patent in Great Britain, No. 5,179, bearing the date of March 5, 1913,) do hereby declare that the following is a full, clear, and exact description of the same.

This invention relates to lock-nuts, and has for its primary object to provide a lock-nut wherein the locking element, which is integral with the nut is designed or shaped to produce a secure and effective locking means without impairing the connection between the nut and element, under the percussive force necessary to secure the nut in its locked position. On the other hand the arrangement of the locking element is designed to receive the percussion at the most effective angle.

Other objects are to provide the bolt with means for locating the position at which the locking may be effected as well as an improved form of locking groove.

Upon the accompanying drawing which illustrates an example of the invention, Figure 1 is an exterior view of a bolt and nut with the latter locked in position thereon. Fig. 2 is an end view. Fig. 3 is a part elevational and part sectional edge view of the improved nut.

$a$ represents the bolt and $b$ the nut. The bolt is provided along its threaded part with a longitudinal wedge-shaped groove $a^1$ having a flat base. This form of groove prevents any tendency of the bolt to split, or fracture when locking the nut in position thereon.

The nut is formed with a conical extension $b^1$ which may be produced at the same time that the nut is being shaped, such extension being of considerable dimensions at its base adjacent to the nut proper, relatively to its outer edge which may be of comparatively small dimensions but preferably slightly rounded as shown.

The groove $a^1$ in the bolt extends, or joins into a notch, or groove $a^2$ made in the end of the bolt, thus when the nut $b$ is required to be secured close to the end of the bolt, and consequently none of the threaded portion visible, the end groove $a^2$ forms an indication as to the position of the groove $a^1$.

The conical extension $b^1$ of the nut enables the locking to be made thorough, inasmuch as the mass of metal gradually becoming denser toward the nut, resists all tendency of the extension to fracture, or shear from the nut when a blow is applied by means of a chisel, or other tool to lock the nut in position. On the other hand the force of the blow acts at such an angle that the metal is compressed as it were into the groove $a^1$ of the bolt and the vibrations set up are spread over a larger mass of metal than would be the case if the extension was of the same relative thickness throughout. The shape of the groove $a^1$, also permits of a firmer keying action between the parts.

The advantages arising from applicants' end face groove are many. Thus it serves not only as an indicator where the locking or unlocking should take place but it also serves particularly as a guide for the unlocking edge of the unlocking tool when the dirt and grime may cover up the end portion of the longitudinal groove when the nut and its conical flange is near the end of the bolt. Thus in inaccessible places or even when light can not be easily obtained one has only to run the edge of the tool along the end of the face of the bolt to unlock the nut which may even be flush with the end of the bolt.

We claim:

In combination a bolt having a longitudinal locking groove and an end face groove arranged radially of the bolt and communicating with said longitudinal groove, and a nut having a collar adapted to be keyed into said longitudinal groove.

In testimony whereof we affix our signatures in presence of two witnesses.

ALBERT EDGAR HICKLING.
HARRY LAMB.

Witnesses:
MALCOLM SMETHURST,
JOHN WILLIAM THOMAS.